(12) United States Patent
Hurst et al.

(10) Patent No.: US 8,624,428 B2
(45) Date of Patent: Jan. 7, 2014

(54) POWER CONTROLLER FOR RECREATIONAL VEHICLES AND TRAVEL TRAILERS AND METHOD FOR USE OF SAME

(75) Inventors: Jack Hurst, Merit, TX (US); Terry Hurst, Merit, TX (US)

(73) Assignee: Hurst Brothers Company, Inc., Merit, TX (US)

( * ) Notice: Subject to any disclaimer, the term of this patent is extended or adjusted under 35 U.S.C. 154(b) by 252 days.

(21) Appl. No.: 13/283,219

(22) Filed: Oct. 27, 2011

(65) Prior Publication Data

US 2012/0104846 A1     May 3, 2012

Related U.S. Application Data

(60) Provisional application No. 61/407,214, filed on Oct. 27, 2010.

(51) Int. Cl.
    *B60L 1/00*        (2006.01)

(52) U.S. Cl.
    USPC ........................................ 307/10.1

(58) Field of Classification Search
    USPC ............. 307/10.1, 11, 29, 36, 42, 43; 361/49, 361/622, 624
    See application file for complete search history.

(56) References Cited

U.S. PATENT DOCUMENTS

| | | | | |
|---|---|---|---|---|
| 3,761,780 A | * | 9/1973 | Plummer | 361/663 |
| 4,785,376 A | * | 11/1988 | Dively | 361/622 |
| 4,873,600 A | | 10/1989 | Vogele | |
| 6,087,818 A | * | 7/2000 | Hughes | 323/301 |
| 6,510,608 B1 | * | 1/2003 | Marshall et al. | 29/869 |
| 6,844,716 B1 | * | 1/2005 | Lundberg et al. | 324/142 |
| 2004/0001292 A1 | * | 1/2004 | Vanderkolk | 361/42 |
| 2008/0253061 A1 | * | 10/2008 | Seff et al. | 361/622 |
| 2010/0142104 A1 | * | 6/2010 | Cooper et al. | 361/49 |

* cited by examiner

*Primary Examiner* — Jared Fureman
*Assistant Examiner* — Rasem Mourad
(74) *Attorney, Agent, or Firm* — Scott T. Griggs; Griggs Bergen LLP

(57) ABSTRACT

A power controller for electrically connecting recreational vehicles and travel trailers to a power pedestal including a primary circuit and a Ground Fault Circuit Interrupter (GFCI) circuit, and a method for use of the same are disclosed. In one embodiment, the power controller includes an electrical housing configured to be installed in a mobile vehicle. A relay switch located within the power controller operates under the direction of a control circuit and, depending on the load conditions, is configured to switch between (i) a first circuit configuration that delivers power from a first electrical input to a first electrical output, and (ii) a second circuit configuration that delivers power from the first electrical input to the first electrical output and, in isolation, from the second electrical input to the second electrical output.

17 Claims, 2 Drawing Sheets

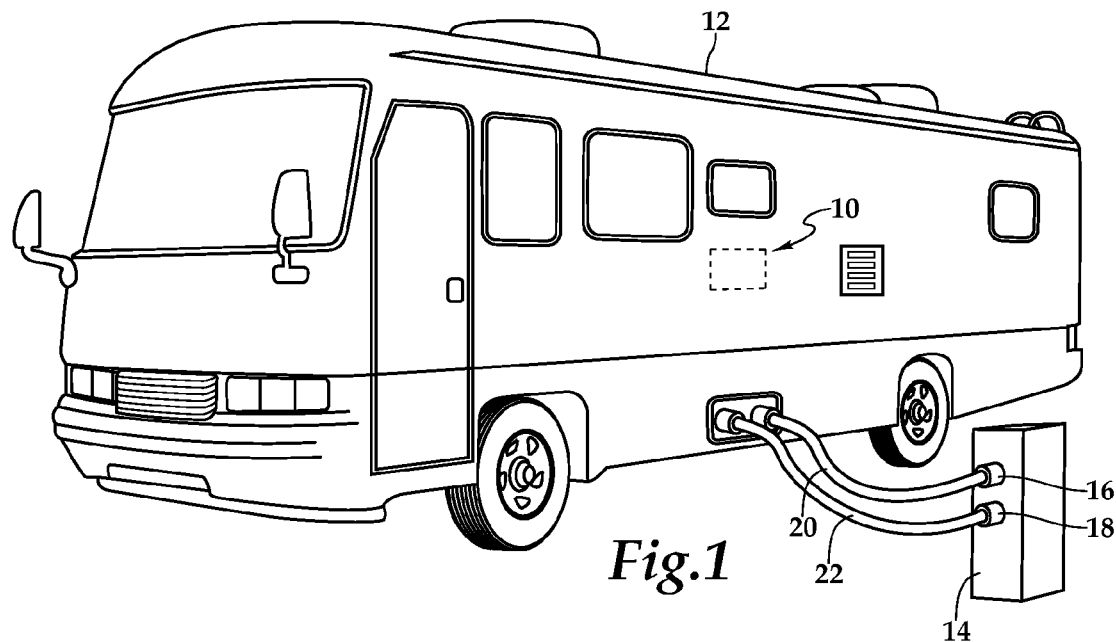
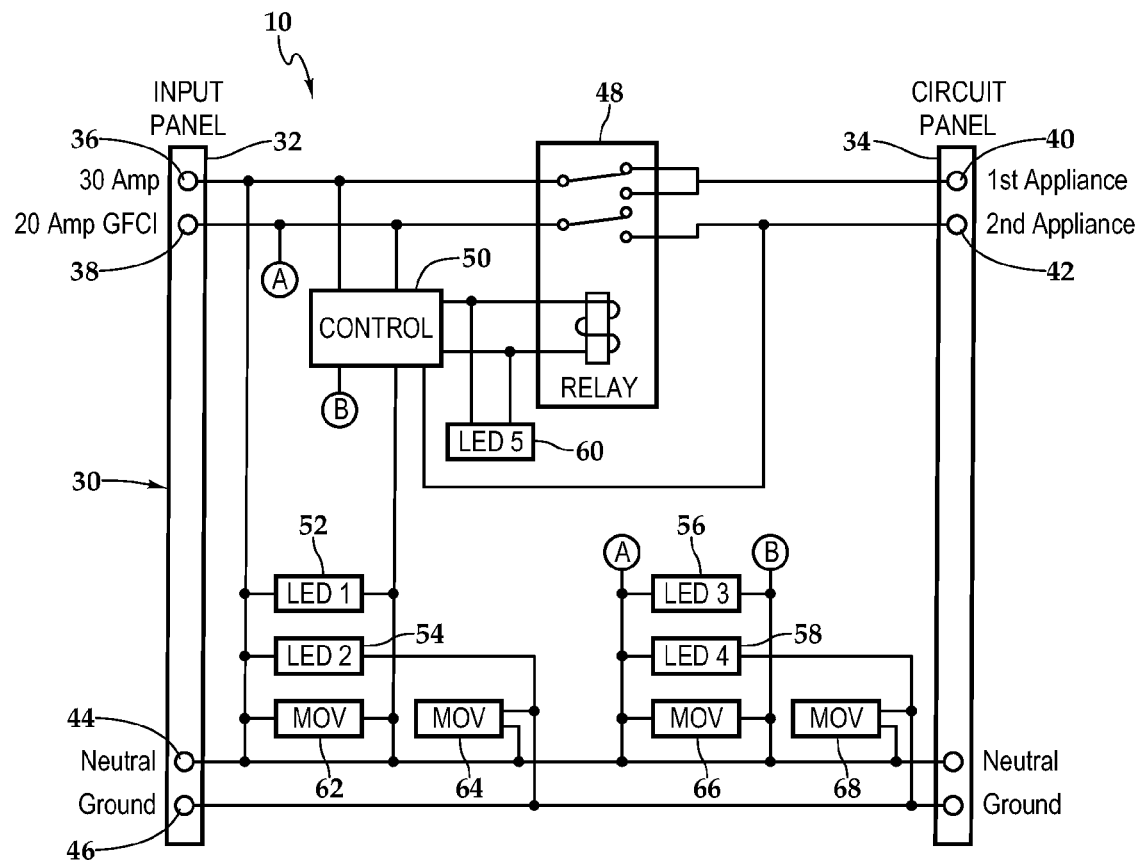

POWER CONTROLLER FOR RECREATIONAL VEHICLES AND TRAVEL TRAILERS AND METHOD FOR USE OF SAME

PRIORITY STATEMENT

This application filed in the names of Jack Hurst and Terry Hurst, both of Merit, Tex. claims the benefit of priority from U.S. Provisional Patent Application No. 61/407,214, entitled "Power Controller for Recreational Vehicles and Travel Trailers" and filed on Oct. 27, 2010 in the names of Hurst et al.; which is hereby incorporated by reference for all purposes.

TECHNICAL FIELD OF THE INVENTION

This invention relates, in general, to electrical accessories for recreational vehicles (RVs) and travel trailers and, in particular, to a power controller for providing multiple power sources at an RV park power pedestal.

BACKGROUND OF THE INVENTION

RV park and campsite power pedestals typically include standard electrical hookups of a 30 A circuit and a 20 A circuit with a ground fault circuit interrupter (GFCI). The power pedestals are intended to provide power for small electrical devices as well as larger electrical appliances such as air conditioners (standard RVs may include two), refrigerators, microwaves, dishwashers, or coffee pots, for example. In operation, when a load is coupled to the power pedestal, the 20 A-GFCI circuit measures and compares the currents in the hot and neutral leads. If the measurements are not equal, the GFCI trips and removes power. When the RV or travel trailer load coupled to the power pedestal includes two appliances, the tripping action very often occurs instantaneous or within 15 seconds. As a result, RV owners are inconvenienced and not able to simultaneously use two appliances at power pedestals. Accordingly, there is a need for systems and methods that enable full utilization of the power at RV and campsite power pedestals.

SUMMARY OF THE INVENTION

It would be advantageous to achieve improved power distribution systems for RV owners parked at campsite power pedestals located within RV parks. It would also be desirable to enable a electrical-based solution that would be both efficient and cost effective at fully utilizing the power at RV and campsite power pedestals. To better address one or more of these concerns, in one aspect of the invention, a power controller and method for delivering power are disclosed for electrically connecting recreational vehicles and travel trailers to a power pedestal including a primary circuit and a GFCI circuit. In one embodiment, the power controller includes an electrical housing. First and second electrical inputs are configured to electrical couple with a primary and a GFCI circuit, respectively. First and second electrical outputs are configured to provide power to first and second appliances.

A relay switch, under the direction of a control circuit, is configured to switch, depending on the load conditions, between (i) a first circuit configuration that delivers power from the first electrical input to the first electrical output, and (ii) a second circuit configuration that delivers power from the first electrical input to the first electrical output and, in isolation, from the second electrical input to the second electrical output. The control circuit is configured to control the relay switch such that (i) the relay switch switches to the first circuit configuration when no load is coupled to the second electrical output, and (ii) the relay switch switches to the second circuit configuration when a load is coupled to the second electrical output. These and other aspects of the invention will be apparent from and elucidated with reference to the embodiment(s) described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic diagram of one embodiment of a power controller for providing multiple power sources at an RV park power pedestal or campsite pedestal;

FIG. 2 is a block circuit diagram depicting one embodiment of a power controller illustrated according to the teachings presented herein.

DETAILED DESCRIPTION OF THE INVENTION

Figure 3:
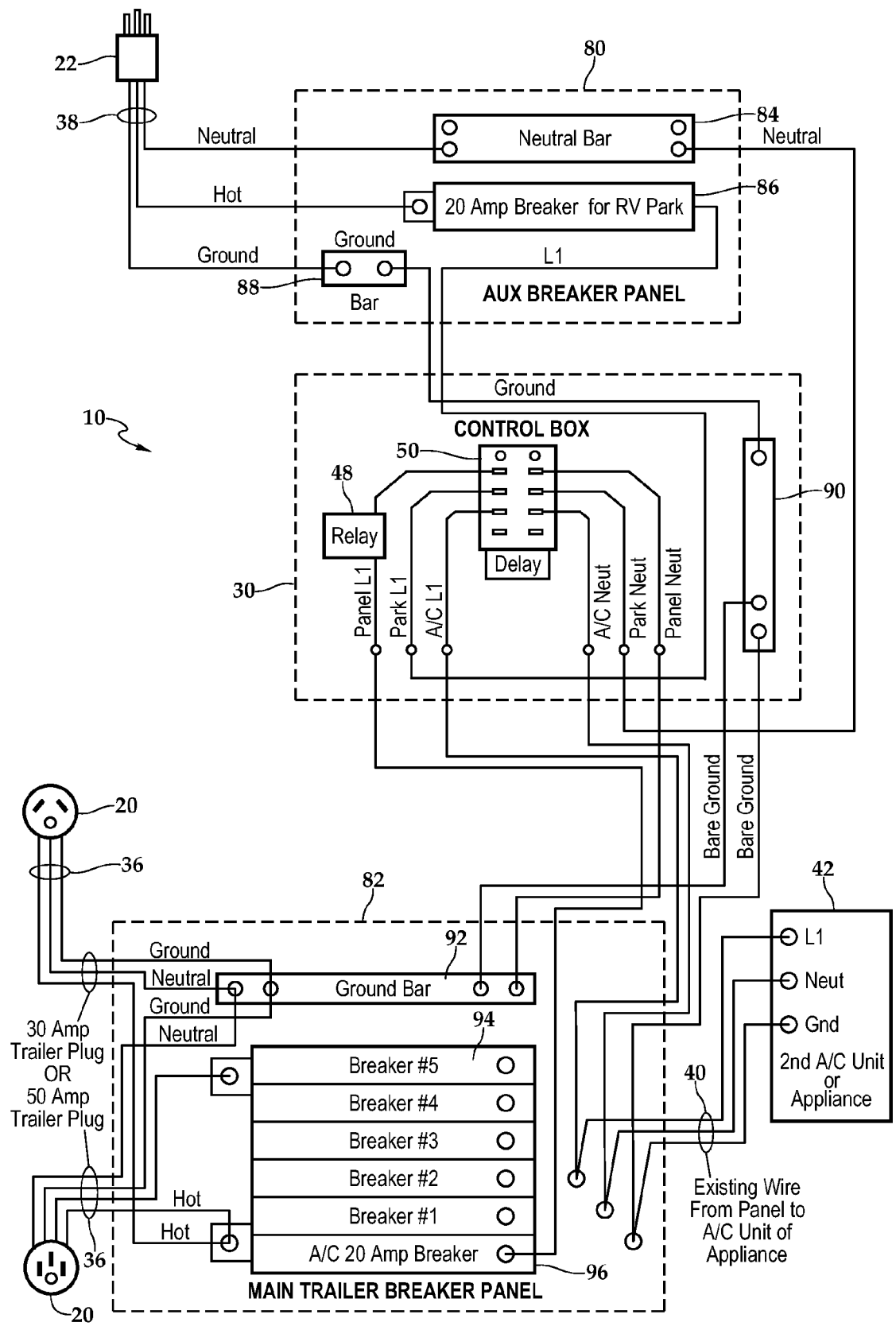
FIG. 3 is a block circuit diagram depicting one operational embodiment of a power controller illustrated according to the teachings presented herein.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Referring initially to FIGS. 1 and 2, therein is depicted a power controller 10 for providing multiple power sources to a recreational vehicle 12 or travel trailer, for example, that is schematically illustrated. The power controller 10 electrically couples recreational vehicles, such as recreational vehicle 12, and travel trailers or more generally mobile vehicles to a power pedestal 14 including a primary circuit 16 and a GFCI circuit 18. The power controller 10 may be connected or otherwise integrated into the recreational vehicle 12, for example. Respective power cords 20, 22 having a male plug adapted to plug into a female outlet of the power pedestal 14 are connected from the recreational vehicle for the primary circuit and the GFCI circuit.

An electrical housing 30, represented by input panel 32 and circuit panel 34, is configured to be installed in the recreational vehicle 12. Moreover, the input panel 32 and circuit panel 34 represent the mounting plates and points of interface of the electrical housing 30 for the power controller. An electrical input 36 receives a first electrical connection from the primary circuit 16, which is depicted as a 30 A circuit. Another electrical input 38 receives a second electrical connection from the GFCI circuit 18 that is depicted as a 20 A GFCI circuit, which is also known as a ground fault interrupter (GFI) circuit or an appliance leakage current interrupter (ALCI) circuit, by other names. It should be appreciated that other amperage circuits may be used with the teachings presented herein. For example, the two input circuits may be 50 A and 20 A rated.

Electrical outputs 40, 42 are configured to provide power to appliances. Neutral and ground wiring 44, 46 are also depicted. A relay switch 48 may include a triple-pole-double throw (TPDT) switch portion that is connected to the 30 A electrical input and 20 A-GFCI input as well as the first and second appliance outputs. These connections permit the relay switch 48 to function as a means for selectively isolating the 20 A-GFCI circuit, when such power is required. More particularly, the relay switch is configured to switch between (i) a first circuit configuration that delivers power from the first electrical input to the first electrical output, and (ii) a second circuit configuration that delivers power from the first electrical input to the first electrical output and, in isolation, from the second electrical input to the second electrical output. In one implementation, the relay switch has a coil rating of more than 100V and is at least 40 A rated.

A control circuit 50, which may be a solid state microchip circuit, is connected to the 30 A electrical input and 20 A-GFCI input as well as the second appliance output and the relay switch. The control circuit 50 is configured to control the relay switch 48 such that (i) the relay switch 48 switches to the first circuit configuration when no load is coupled to the second electrical output, and (ii) the relay switch 48 switches to the second circuit configuration when a load is coupled to the second electrical output.

As shown, a series of five LEDs 52, 54, 56, 58, 60 are incorporated into the power controller to provide various status indicators. Additionally, multiple metal oxide varistors (MOVs) 62, 64, 66, 68 are included for surge protection. It should be appreciated that while one particular circuit architecture is presented, other architectures are within the teachings presented herein.

In operation, an automated scheme is provided for selectively isolating the GFCI circuit when required in order to avoid tripping the breaker. By isolating the GFCI circuit from the primary circuit, the 20 A-GFCI circuit only measures and compares the currents in the hot and neutral leads of the 20 A-GFCI circuit, without regard to the 30 A primary circuit. As a result, an unintended trip condition is avoided and an RV or travel trailer user may utilize the full power of the primary and GFCI circuits.

Referring to FIG. 3, another embodiment of the power controller 10 is depicted. In this implementation, the power controller 10 is depicted interposed between an auxiliary breaker panel 80 and a main trailer breaker panel 82. The power cord 22 electrically couples the GFCI circuit 18 to the power controller 10 at the auxiliary breaker panel 80, which includes a neutral bar 84, breaker 86, and ground bar 88. The main breaker panel 82 includes a ground bar 92, a number of breakers 94, and a 20 A breaker 96. The power cord 20 for input 36 may be a 30 A or 50 A input for the primary circuit 16 as shown.

The power controller 10 includes the relay switch 48 which, as discussed, is configured to switch between (i) a first circuit configuration that delivers power from the first electrical input 36 to the first electrical output 40, and (ii) a second circuit configuration that delivers power from the first electrical input 36 to the first electrical output 40 and, in isolation, from the second electrical input 38 to the second electrical output 42. A ground bar is provided. The control circuit 50 is configured to control the relay switch 48 such that (i) the relay switch 48 switches to the first circuit configuration when no load is coupled to the second electrical output 42 (e.g., no second appliance load), and (ii) the relay switch 48 switches to the second circuit configuration when a load (e.g., second appliance load) is coupled to the second electrical output.

In operation, the power controller 10 configures the available power in a typical RV Park (30 A main or primary circuit and 20 A circuit or GFCI auxiliary) for use in an RV automatically. Once the power controller 10 is installed, the existing power cord is installed into the 30 A service and the additional power cord (added to the RV with the power controller) is plugged into the 20 A circuit or GFCI. The power controller is the only power management tool on the market that will allow you to put the full 50 A of service available at a typical RV park 30 A power pole to work in your RV, regardless of whether the 20 A auxiliary outlet is a GFCI or not. Once installed, two appliances, such as two AC units, may be operated simultaneously.

The power controller 10 is a power management solution that allows utilization of existing RV park infrastructure, i.e., the typical RV hook up (30 A main or primary service with auxiliary 20 A circuit or GFCI). Once installed, the power controller operates automatically, so there are no switches or meters to monitor. Additionally, the power controller provides a much better alternative to the traditional cheater boxes, which are prone to failure.

The following table specifies the components which have been used in a successful prototype of the power controller manufactured according to the teachings presented herein and FIG. 3. These components should be considered exemplary and non-limiting.

TABLE I

Successful Prototype Components

| Name | Manufacturer | Type/Model | Technical Data and securement means |
|---|---|---|---|
| Nameplate | Various | Various | Water resistant pressure sensitive calenared vinyl. 3 mil material. |
| Enclosure | Various | Various | 10 in. × 10 in. × 4 in. 16 Gauge Steel Screw cover box with knock-outs, grey powder coated |
| Circuit Breaker | Various | Various | Standard type, 120 VAC, 20 Amp, 10 kA Interrupting |
| Load Center | Various | Various | Standard type, 120/240 VAC, 30 Amp, 1Ph, Type 1 enclosure with knockouts |
| Relay (2 Used) | Clion | HHC71B (JQX-38F) | 3 Pole DT, 40 Amp, 250 VAC, Coil: 120 VAC |
| Standoffs (2 Used) | Various | Various | Standoff, 0.25 in. Hex, Lenght 0.75 in., Nylon 6/6 material, 8-32 Thread, Used with Nylon 8-32 nut on PCB |
| Label, Ground (2 Used) | Various | Various | Water resistant pressure sensitive calendared vinyl. 3 mil material. Acrylic-base permanent adhesive. See illustration 3 for details. |
| Conductor, Ground | Various | Various | Green jacket, 10 AWG, 60° min, 300 V min., Stranded Copper |
| Grounding Bar | Lugs Direct (Brumall Manuf.) | 4-3, 2 | 2 position, Wire size 4-14 AAWG, Material: Tin plated high strength tempered aluminum |
| Conductor, Neutral | Various | Various | White jacket, 10 AWG, 60° min, 300 V min., Stranded Copper |
| Conductor, L1 | Various | Various | Black or red jacket, |

TABLE I-continued

Successful Prototype Components

| Name | Manufacturer | Type/Model | Technical Data and securement means |
|---|---|---|---|
| Grounding Bar | Lugs Direct (Brumall Manuf.) | 4-8, 1, 8 | 10 AWG, 60° min, 300 V min., Stranded Copper 6 position, Wire size 4-14 AWG Material: Tin plated high strength tempered aluminum |
| Label, Field Conductor & Min. Torque | Various | Various | Water resistant pressure sensitive calendared vinyl. 3 mil material, Acrylic-base permanent adhesive |
| Time Delay | ICS | KH101AKE | 120 VAC, 0.5 to 5 second, ON delay |
| Lug, PCB (6 Used) | Lugs Direct (Inter. Hydraulics) | B2A-PCB-HEX | Wire Size: 2-14 AWG, 115 Amps |
| Bare PCB | Various | Various | Two sided plated through copper. Size: 5 in. × 7 in. Material: Recognized FR4 |
| Standoffs (6 Used) | Various | Various | Standoff, 0.25 in. Hex, Length: 0.75 in., 8-32 thread |
| Wiring Diagram | Various | Various | Water resistant pressure sensitive calendared vinyl, 3 mil material |

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A power controller for electrically connecting recreational vehicles and travel trailers to a power pedestal including a primary circuit and a Ground Fault Circuit Interrupter (GFCI) circuit, the power controller comprising:
    an electrical housing configured to be installed in a mobile vehicle;
    a first electrical input for receiving a first electrical connection from the primary circuit;
    a second electrical input for receiving a second electrical connection from the GFCI circuit;
    a first electrical output configured to provide power to a first appliance;
    a second electrical output configured to provide power to a second appliance;
    a relay switch configured to switch between (i) a first circuit configuration that delivers power from the first electrical input to the first electrical output, and (ii) a second circuit configuration that delivers power from the first electrical input to the first electrical output and from the second electrical input to the second electrical output; and
    a control circuit configured to control the relay switch such that (i) the relay switch switches to the first circuit configuration when no load is coupled to the second electrical output, and (ii) the relay switch switches to the second circuit configuration when a load is coupled to the second electrical output.

2. The power controller as recited in claim 1, wherein the mobile vehicle is selected from the group consisting of RVs and travel trailers.

3. The power controller as recited in claim 1, wherein the first appliance is selected from the group consisting of air conditioners, refrigerators, microwaves, dishwashers, and coffee pots.

4. The power controller as recited in claim 1, wherein the second appliance is selected from the group consisting of air conditions, refrigerators, microwaves, dishwashers, and coffee pots.

5. The power controller as recited in claim 1, wherein the primary circuit comprises a 30 A circuit.

6. The power controller as recited in claim 1, wherein the primary circuit comprises a 50 A circuit.

7. The power controller as recited in claim 1, wherein the GFCI circuit comprises a 20 A-GFCI circuit.

8. The power controller as recited in claim 1, further comprising a ground bar.

9. The power controller as recited in claim 1, wherein the control circuit comprises a solid state microchip circuit.

10. A power controller for electrically connecting recreational vehicles and travel trailers to a power pedestal including a primary circuit and a Ground Fault Circuit Interrupter (GFCI) circuit, the power controller comprising:
    an electrical housing configured to be installed in a mobile vehicle;
    a first electrical input for receiving a first electrical connection from the primary circuit, the first electrical input configured to provide electrical connectivity to a power cord having a male plug adapted to plug into a female outlet of the power pedestal;
    the first electrical input including a plurality of wires configured to electrically couple to a breaker panel of the mobile vehicle;
    a second electrical input for receiving a second electrical connection from the GFCI circuit, the second electrical input including a power cord having a male plug adapted to plug into a female outlet of the power pedestal;
    a first electrical output configured to provide power to a first appliance via the breaker panel of the mobile vehicle;
    a second electrical output configured to provide power to a second appliance via a relay switch within the mobile vehicle;
    the relay switch configured to switch between (i) a first circuit configuration that delivers power from the first electrical input to the first electrical output, and (ii) a second circuit configuration that delivers power from the first electrical input to the first electrical output and from the second electrical input to the second electrical output; and
    a control circuit configured to control the relay switch such that (i) the relay switch switches to the first circuit configuration when no load is coupled to the second electrical output, and (ii) the relay switch switches to the second circuit configuration when a load is coupled to the second electrical output.

11. The power controller as recited in claim 10, wherein the mobile vehicle is selected from the group consisting of RVs and travel trailers.

12. The power controller as recited in claim 10, wherein the first appliance is selected from the group consisting of air conditioners, refrigerators, microwaves, dishwashers, and coffee pots.

13. The power controller as recited in claim 10, wherein the second appliance is selected from the group consisting of air conditions, refrigerators, microwaves, dishwashers, and coffee pots.

14. A power controller for electrically connecting recreational vehicles and travel trailers to a power pedestal including a primary circuit and a Ground Fault Circuit Interrupter (GFCI) circuit, the power controller comprising:
- an electrical housing configured to be installed in a mobile vehicle;
- a first electrical input for receiving a first electrical connection from the primary circuit, the first electrical input configured to provide electrical connectivity to a power cord having a male plug adapted to plug into a female outlet of the power pedestal;
- the first electrical input configured to interface with the primary circuit which is selected from the group consisting of 30 A circuits and 50 A circuits;
- the first electrical input including a plurality of wires configured to electrically couple to a breaker panel of the mobile vehicle;
- a second electrical input for receiving a second electrical connection from the GFCI circuit, the second electrical input including a power cord having a male plug adapted to plug into a female outlet of the power pedestal;
- the second electrical input configured to interface with a 20 A-GFCI circuit;
- a first electrical output configured to provide power to a first appliance via the breaker panel of the mobile vehicle, the first appliance selected from the group consisting of air conditions, refrigerators, microwaves, dishwashers, and coffee pots;
- a second electrical output configured to provide power to a second appliance via a relay switch within the mobile vehicle;
- the relay switch configured to switch between (i) a first circuit configuration that delivers power from the first electrical input to the first electrical output, and (ii) a second circuit configuration that delivers power from the first electrical input to the first electrical output and from the second electrical input to the second electrical output; and
- a control circuit configured to control the relay switch such that (i) the relay switch switches to the first circuit configuration when no load is coupled to the second electrical output, and (ii) the relay switch switches to the second circuit configuration when a load is coupled to the second electrical output.

15. A method for controlling the power supply received by recreational vehicles and travel trailers at a power pedestal including a primary circuit and a Ground Fault Circuit Interrupter (GFCI) circuit, the method comprising:
- installing a power controller in a mobile vehicle, the mobile vehicle being selected from the group consisting of recreational vehicles and travel trailers, the power controller including: (i) an electrical housing, (ii) a first electrical input for receiving a first electrical connection from the primary circuit, the first electrical input configured to provide electrical connectivity to a power cord having a male plug adapted to plug into a female outlet of the power pedestal, (iii) a second electrical input for receiving a second electrical connection from the GFCI circuit, the second electrical input including a power cord having a male plug adapted to plug into a female outlet of the power pedestal, (iv) a first electrical output configured to provide power to a first appliance via the breaker panel of the mobile vehicle, and (v) a second electrical output configured to provide power to a second appliance via a relay switch within the mobile vehicle;
- electrically coupling the first electrical input with a plurality of wires to a breaker panel of the mobile vehicle;
- plugging two power cords into the power pedestal, the two power cords respectively corresponding to the primary circuit and the Ground Fault Circuit Interrupter (GFCI) circuit;
- switching with the relay switch between (i) a first circuit configuration that delivers power from the first electrical input to the first electrical output, and (ii) a second circuit configuration that delivers power from the first electrical input to the first electrical output and from the second electrical input to the second electrical output; and
- controlling the relay switch with a control circuit such that (i) the relay switch switches to the first circuit configuration when no load is coupled to the second electrical output, and (ii) the relay switch switches to the second circuit configuration when a load is coupled to the second electrical output.

16. The method as recited in claim 15, further comprising selecting the first appliance from the group consisting of air conditioners, refrigerators, microwaves, dishwashers, and coffee pots.

17. The method as recited in claim 16, further comprising selecting the second appliance from the group consisting of air conditioners, refrigerators, microwaves, dishwashers, and coffee pots.

* * * * *